United States Patent [19]

Liron

[11] 4,428,044

[45] Jan. 24, 1984

[54] PERIPHERAL UNIT CONTROLLER

[75] Inventor: Moshe Liron, Evanston, Ill.

[73] Assignee: Bell Telephone Laboratories, Incorporated, Murray Hill, N.J.

[21] Appl. No.: 77,512

[22] Filed: Sep. 20, 1979

[51] Int. Cl.³ ............................................. G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,602,900 | 8/1971 | Delaigue et al. | 364/200 |
| 3,624,604 | 11/1971 | Gibbard | 364/200 |
| 3,678,467 | 7/1972 | Nussbaum et al. | 364/200 |
| 3,761,884 | 9/1973 | Avsan | 364/200 |
| 3,898,621 | 8/1975 | Zelinski et al. | 364/200 |
| 3,911,402 | 10/1975 | McLean | 364/200 |
| 3,932,847 | 1/1976 | Smith | 364/200 |
| 4,021,784 | 5/1977 | Kimlinger et al. | 364/200 |
| 4,035,777 | 7/1977 | Moreton | 364/200 |
| 4,059,736 | 11/1977 | Perucca et al. | 364/200 |
| 4,099,234 | 7/1978 | Woods et al. | 364/200 |
| 4,099,241 | 7/1978 | Ossfeldt | 364/200 |
| 4,101,969 | 7/1978 | Lawson et al. | 364/900 |
| 4,124,889 | 11/1978 | Kaufman et al. | 364/200 |

*Primary Examiner*—Gareth D. Shaw
*Assistant Examiner*—John G. Mills
*Attorney, Agent, or Firm*—P. Visserman

[57] ABSTRACT

A synchronization scheme is used in a peripheral unit controller which consists of two duplicated units whose outputs are matched. In addition, each duplicated unit contains a pair of microprocessors whose outputs are also matched. The synchronization scheme allows each microprocessor to run its own diagnostics independently, and to synchronize itself with the other microprocessor of the pair. After the synchronization occurs in both microprocessor pairs, the duplicated units are synchronized. Synchronization is achieved by using a real-time clock and the interrupt structure of each microprocessor.

13 Claims, 12 Drawing Figures

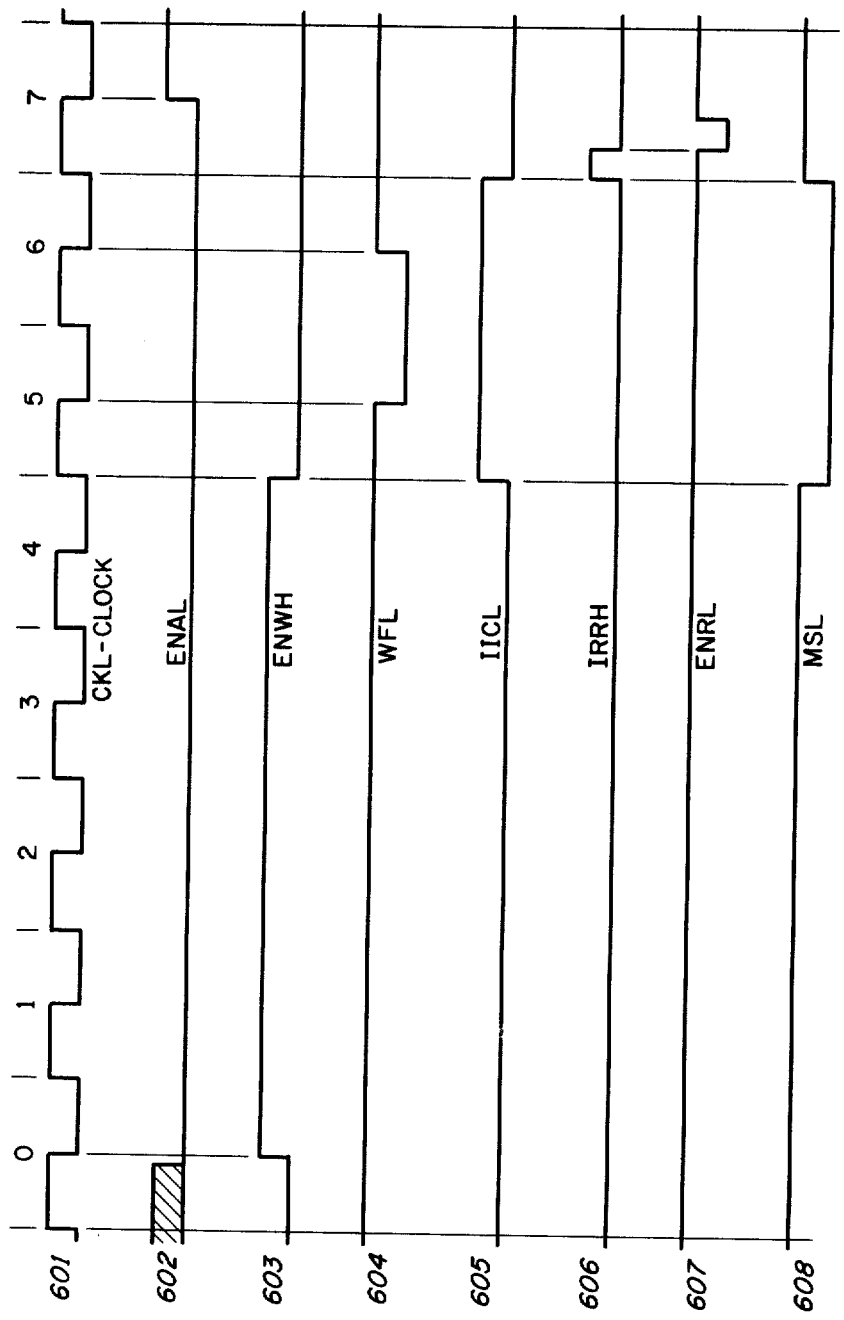

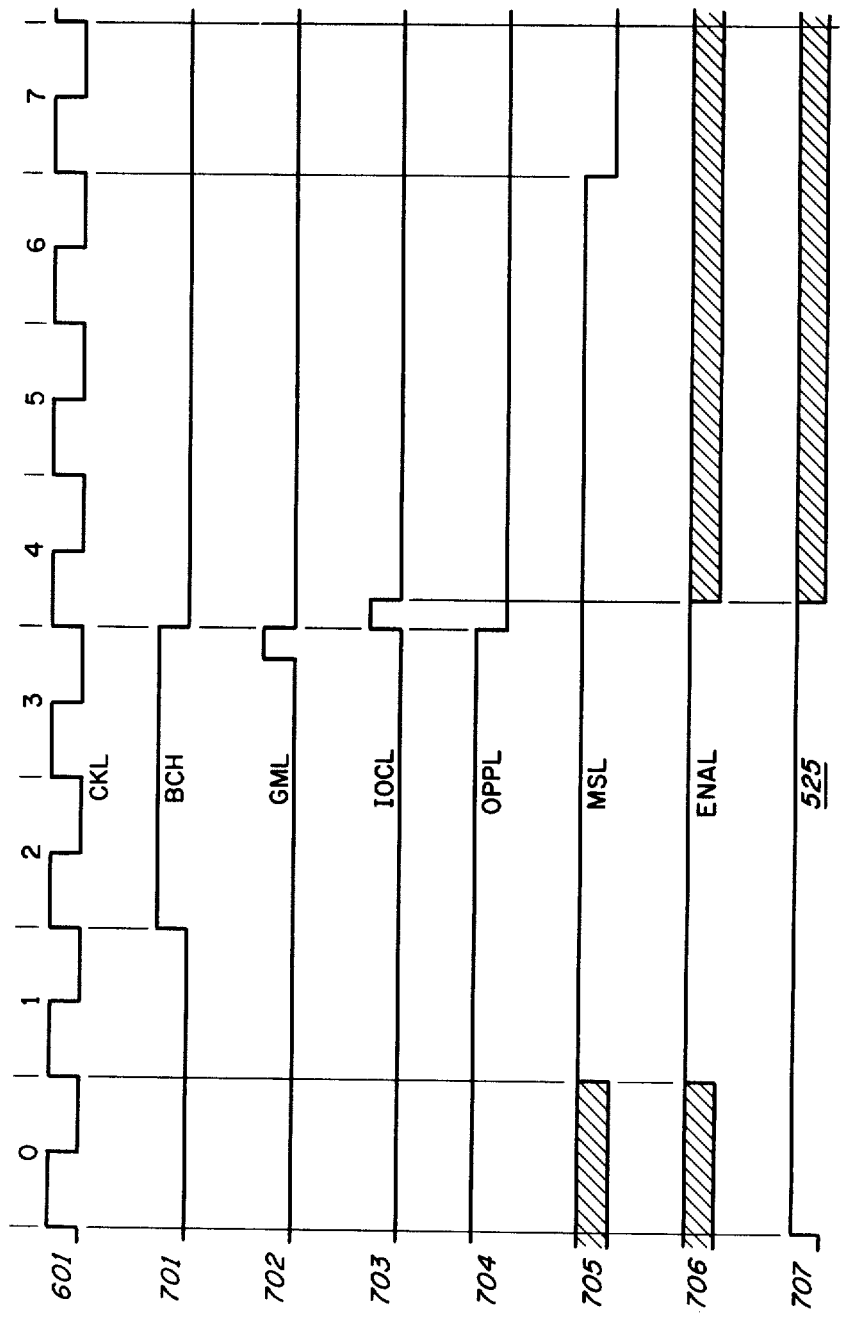

PERIPHERAL UNIT CONTROLLER

TECHNICAL FIELD

This invention relates to data processing systems and more particularly, to peripheral controllers wherein a peripheral unit controller controls the actions of a plurality of input/output (I/O) devices.

BACKGROUND OF THE INVENTION

In certain data processing systems, the main processor may not have the required data processing rate to perform the necessary calculations and to control the I/O devices. In one solution to this problem relating to the data processing capacity, it is known that the load on the main processor can be reduced by providing a secondary processor, controlled by the main processor, which performs the necessary processing for the I/O devices. Such a secondary processor will be herein referred to as a peripheral unit controller.

In prior art systems typically, the main processor transmits high level orders to the peripheral unit controller, and the peripheral unit controller performs the required control on the I/O device to execute the order. Microprocessors or microprogrammed controllers have been used in peripheral unit controllers before as illustrated by U.S. Pat. No. 4,124,889 of Kaufman et al. In Kaufman et al., one peripheral unit controller, which is composed of a microprogrammed controller, alone controls a number of I/O devices. The failure of the microprogrammed controller means that group of I/O devices is unavailable for use by the data processing system. The single microprocessor per peripheral unit controller has proven successful in applications which have low reliability requirements and do not command a great deal of maintainability. Most data processing systems have such requirements. However, systems such as telecommunication systems have greater requirements for reliability and maintainability.

SUMMARY OF THE INVENTION

Advantageously, in a data processing system in accordance with the present invention, a highly reliable peripheral unit controller is provided having duplicated synchronized subprocessors and a timer circuit which is used to initiate synchronous operation. To start synchronized operation of the two subprocessors, the system's main processor directs peripheral orders to start the two subprocessors. The first one of the subprocessors is responsive to the peripheral order to start the timer and both subprocessors are responsive to the peripheral orders to enter a halt state. The timer, after a predetermined period of time generates a timer completion signal and both subprocessors start synchronous operation and transmit an acknowledge order to the main processor. The receipt of both acknowledge orders by the main processor is indicative of synchronous operation of the two subprocessors. A second timer may be provided in the peripheral unit controller, and the second subprocessor may be adapted to generate a timer control signal therefor. The second timer will be responsive to the timer control signal of the second subprocessor to generate a second timer completion signal which is generated a greater period of time after the occurrence of the timer control signal than the period of time of the first timer. In the absence of the first timer completion signal, the second subprocessor will respond to the second timer completion signal, to transmit an acknowledge order to the main processor indicative of nonsynchronous operation. Further, the two subprocessors may be interconnected and the first subprocessor may be responsive to the first peripheral order to generate and transmit a special instruction to the second subprocessor. The second subprocessor, in turn, is responsive to the special instruction and to the second peripheral order to enter its halt state.

Each of the two subprocessors may comprise two microprocessor systems which operate in synchronism. The microprocessor systems are synchronized by means of an initialization order from the main processor, whereby both microprocessor arrangements enter a half state and both are responsive to an initial timer completion signal to initiate synchronous operations. Accordingly, a peripheral controller in accordace with one aspect of this invention comprises a pair of synchronized subprocessors, each of which comprises a pair of synchronized microprocessor systems.

In accordance with another aspect of the invention, the two timer circuits associated with the duplicated subprocessors may each be divided into two subtimers. One subtimer generates timer completion signals for purposes of initialization and provides this signal to both microprocessor systems of a subprocessor. Additionally, both subtimers are used by the microprocessor systems to provide timeout signals to the associated microprocessor system during normal operations.

Each duplicated set of microprocessors in a subprocessor may be referred to as a microcomputer, and a first-in/first-out memory (FIFO) is associated with each microcomputer. The FIFO may be used to store data words received from the main processor defining functions to be executed by the microprocessors. In accordance with one aspect of this invention, the FIFO memories of the two microcomputers are interconnected by means of a bus and memory decoder circuits; and a data word transmitted from the central processor to the first microcomputer is stored in the FIFO of both microcomputers. In this manner, the data words stored in the FIFO memories will be identical; and execution of identical functions by the two microcomputers may be assured.

Advantageously, a system in accordance with the invention may comprise a clock circuit and a control flip-flop in each of the subprocessors. Each of the clock circuits comprises an oscillator and selecting circuitry, and the oscillator of each clock circuit is connected to its associated selecting circuitry and the selecting circuitry of the other clock circuit. The selecting circuitry of each clock circuit generates a clock output signal from the associated oscillator when the associated control flip-flop is in one state or the oscillator of the other clock circuit is inoperative and generates a clock signal from the oscillator of the other clock circuit when the associated control flip-flop is in another state or the associated oscillator is inoperative. Additionally, each clock circuit may comprise a slave clock and circuitry for connecting the associated oscillator to the slave when the control flip-flop is in the one state or the oscillator of the other clock circuit is inoperative and connecting the slave to the output signal of the oscillator of the other clock circuit when the associated flip-flop is in the other state or the associated oscillator is inoperative.

The control flip-flops may also be used for communication with an input/output device whereby the input- /output device is responsive to input/output orders from the first subprocessor when the flip-flop is in one state and responsive to input/output orders from the second subprocessor when the flip-flop is in the other state. The two subprocessors will usually operate in an in-step mode; and in that case, the input/output orders are compared by means of a matcher which generates an error signal in the event of a mismatch.

Further, in accordance with another aspect of the invention, data may be transferred from the first subprocessor to the second subprocessor by means of memory data transfer circuits of the first and second subprocessors. The memory data transfer circuit of the first subprocessor, under control of its associated microcomputer, will read a data word from its associated memory and transfer the data word to the memory data transfer circuit of the second subprocessor where it may be written into the data memory of the second subprocessor.

BRIEF DESCRIPTION OF THE DRAWING

The invention may be better understood from the following detailed description when read with reference to the drawing in which:

FIG. 6 is a timing diagram showing the relationship of the signals used for the data input sequence of the FIFO;

FIG. 7 is a timing diagram detailing the signals generated for the data output sequence of the FIFO;

DETAILED DESCRIPTION

Figure 1:
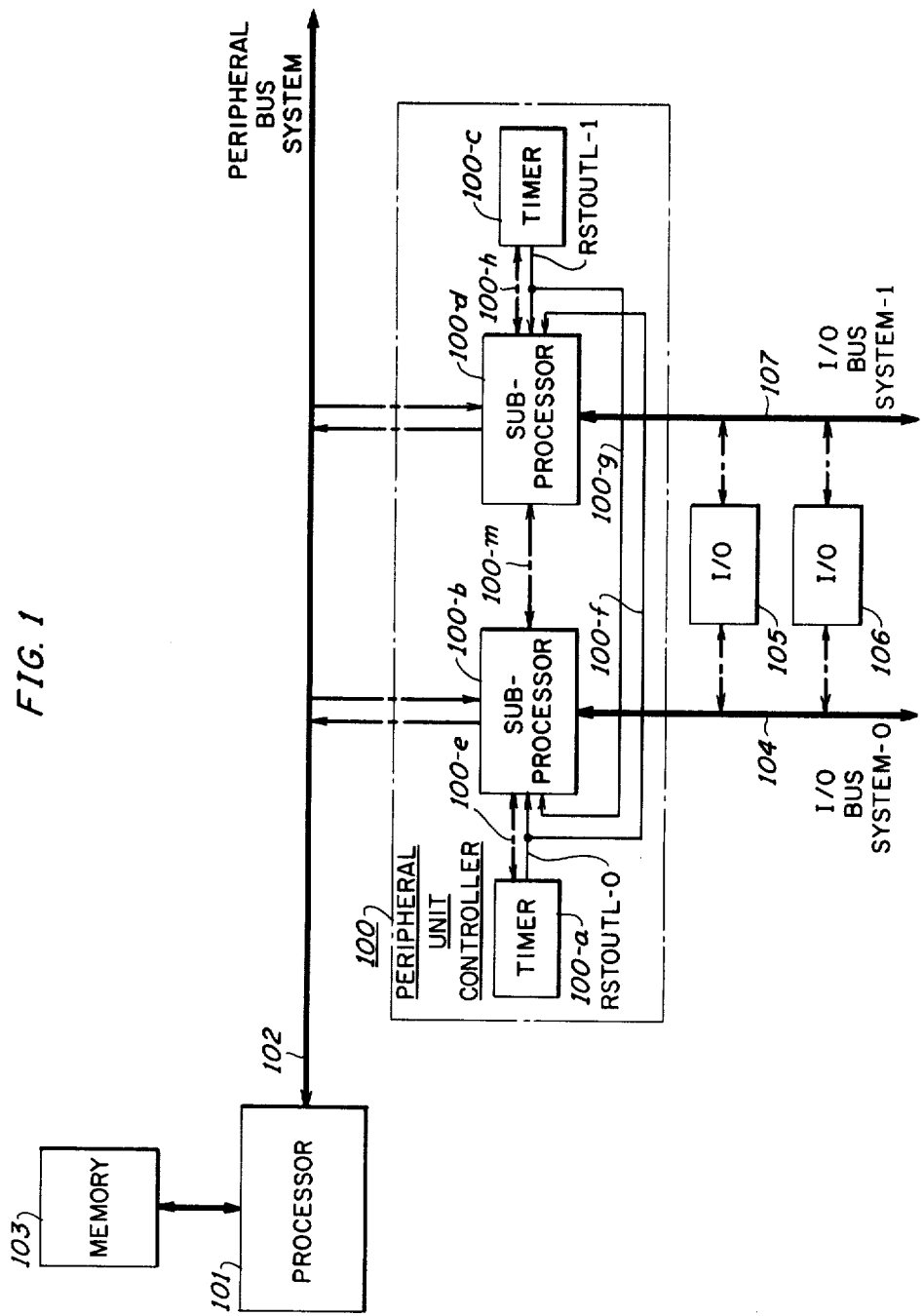
FIG. 1 is a block diagram representation of a data processing system embodying the present invention.

One illustrative embodiment of a peripheral unit controller according to the invention is shown as block 100 in FIG. 1. For purposes of illustration, the peripheral unit controller is shown in the drawing as part of a telecommunication system of the type generally described in U.S. Pat. No. 3,570,008, R. W. Downing et al. This patent discloses system components such as the processor 101, memory 103 and peripheral bus system 102, shown in FIG. 1. Processor 101 is adapted to execute a program in memory 103 and to transmit peripheral orders via peripheral bus system 102 to peripheral unit controller 100. For each peripheral order, peripheral unit controller 100 interprets the peripheral order and sends a series of I/O orders to I/O device 105 or I/O device 106 via I/O bus system-0 104 or I/O bus system-1 107. Peripheral unit controller 100 receives data from the I/O devices via I/O bus system-0 104 or I/O bus system-1 107 and sends the results of the peripheral operation back to processor 101 via peripheral bus system 102. The I/O devices 105 and 106 may be any peripheral unit capable of receiving or transmitting data in response to peripheral orders from peripheral unit controller 100.

Peripheral unit controller 100 is a highly reliable device which uses duplicated subprocessors 100-b and 100-d that may execute instructions in synchronization. When the subprocessors are executing instruction in synchronization, the subprocessors are operating in the duplex mode. When only one subprocessor is executing instructions which perform the peripheral unit controller 100's functions, that subprocessor is operating in the simplex mode. Duplicated timer circuits 100-a and 100-c, each connected to the subprocessors, provide synchronization signals for the subprocessors. Either subprocessor may be designated by the processor 101 to be the master subprocessor, thereby designating the other subprocessor as the slave. The two subprocessors communicate with each other via bus 100-m.

The following example illustrates how initialization and synchronization are achieved between subprocessor 100-b and subprocessor 100-d during the initialization of peripheral unit controller 100 by processor 101. To initialize the controller, processor 101 designates one of the subprocessors, e.g., subprocessor 100-b, as the master subprocessor, and the other, e.g., subprocessor 100-d, as the slave subprocessor. Processor 101 transmits a peripheral order via peripheral bus system 102 to the master subprocessor which causes the master subprocessor to start performing the functions of the peripheral unit controller in the simplex mode. Using additional peripheral orders, processor 101 transmits the necessary I/O state and control information required to perform the peripheral unit controller functions, the master subprocessor stores this state and control information in internal memory. Additionally, processor 101 transmits a peripheral order to the slave subprocessor, which causes the slave subprocessor to go into the maintenance mode. While in the maintenance mode, the slave subprocessor is executing diagnostic programs.

To start the synchronization process, processor 101 transmits a peripheral order to the slave subprocessor to prepare to go into the duplex mode. After certain housekeeping routines are done, the slave subprocessor scans cable 100-m for a subprocessor order which is also referred to herein as a microcomputer order from the master subprocessor. Next, processor 101 sends to the master subprocessor a peripheral order to start the synchronization process. The next step in synchronization is to transfer the I/O state control information stored in the master subprocessor's internal memory to the slave subprocessor's internal memory. Each subprocessor has a memory data transfer circuit which accesses the subprocessor's internal memory. The memory transfer circuits transmit data between themselves via cable 100-m. Master subprocessor starts the transfer by transmitting the microcomputer order and the first information word to the slave microprocessor.

After the internal memory of the slave subprocessor has been updated completely, the master subprocessor sets timer 100-a for 5 milliseconds and executes a halt instruction. The slave subprocessor sets timer 100-c for 7 milliseconds and executes a halt instruction. The completion signal of timer 100-a is coupled to both the master and the slave subprocessors via conductor 100-f. If timer 100-a sends a completion signal to both subprocessors, they start in synchronization with each other and transmit to processor 101 acknowledge orders indicating that the operation is normal. Also, the slave subprocessor stops the timing sequence of timer 100-c. If timer 100-c transmits a completion signal to the slave subprocessor, this completion signal indicates that an error condition exists, since timer 100-a did not correctly time out. The master subprocessor remains in the halt state, but the slave subprocessor transmits an acknowledge order to processor 101. This acknowledge order informs processor 101 that the master subprocessor is not running. The slave subprocessor takes over the simplex operation of the peripheral unit controller. The result is that peripheral unit controller 100 is operational in either the simplex or duplex mode.

Figure 2:
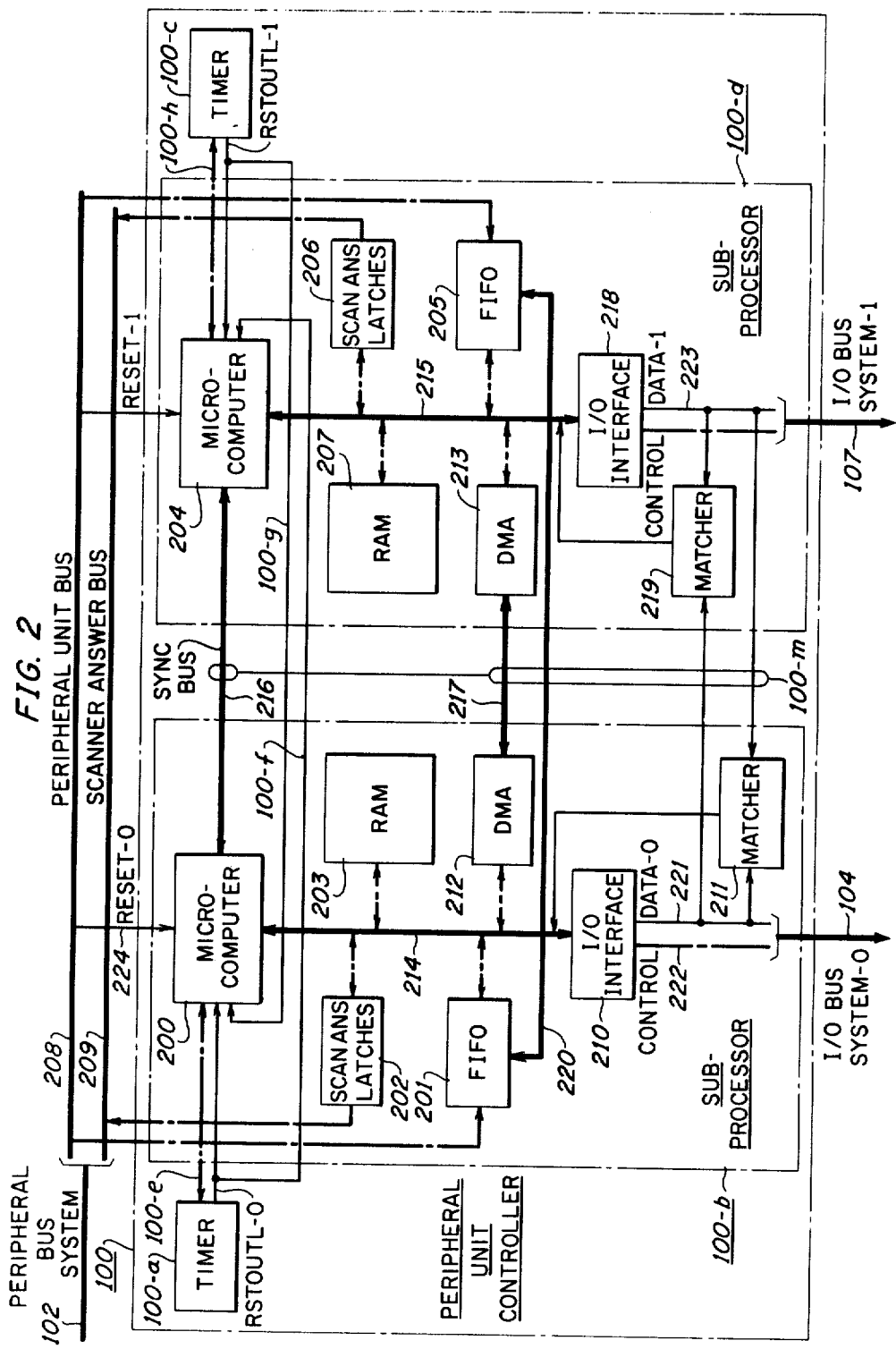
FIG. 2 shows an illustrative embodiment of a peripheral unit controller in accordance with the invention.

Peripheral unit controller 100 is shown in greater detail in FIG. 2. Each subprocessor is composed of a microcomputer, scanner answer latches circuit, a first-in/first-out (FIFO) memory, a direct memory access (DMA) circuit, and a random access memory (RAM). A subprocessor's memory data transfer circuit is the associated DMA. As will be further described later herein with respect to FIG. 3, each microcomputer comprises a pair of microprocessors which operate in synchronization and programmed read only memories (PROMs) to store the program for the microprocessors. RAMs 203 and 207 store the I/O state data defining the operations which are taking place with respect to the I/O devices connected to the I/O bus system-0 104 and I/O bus system-1 107. RAMs 203 and 207 may be composed of any number of commercially available devices such as Intel 2114 integrated circuits. Peripheral bus system 102 is composed of peripheral unit bus 208 and scanner answer bus 209.

The synchronization process is now described in greater detail with respect to FIG. 2. Within the two subprocessors, synchronization is to be achieved between microcomputer 200 and microcomputer 204. When processor 101 transmits to subprocessor 100-b, master subprocessor, a peripheral order causing subprocessor 100-b to go into the simplex mode, the peripheral order is transmitted over peripheral unit bus 208, to FIFO 201 and read from FIFO 201 by microcomputer 200. When processor 101 transmits the second peripheral order to subprocessor 100-d, slave subprocessor, instructing subprocessor 100-d to go into the maintenance mode, the peripheral order is transmitted via peripheral unit bus 208, FIFO 205, and bus 215. The internal storage of subprocessor 100-b is RAM 203 which has been updated by microcomputer 200 to contain the proper I/O state information with respect to the peripheral unit controller functions. Before microcomputer 204 can be synchronized with microcomputer 200, the information contained in RAM 203 must be copied into RAM 207. This data transfer is accomplished by DMA 212, DMA 213, and bus 217. Before the data transfer can be accomplished, microcomputer 200 and 204 must initialize DMA 212 and DMA 213, respectively, with the starting address and the number of data words to be transferred. In addition to the data transfer function, the DMAs provide a means for the microcomputers to transmit microcomputer orders between microcomputers.

When subprocessor 100-d receives the peripheral order to prepare to go into the duplex mode, microcomputer 204 scans DMA 213 for a microcomputer order from microcomputer 200. When subprocessor 100-d receives the peripheral order to start the synchronization process, microcomputer 200 initializes DMA 212 and transmits a microcomputer order to microcomputer 204. Upon receipt of the microcomputer order from microcomputer 200, microcomputer 204 initializes DMA 213 both to read words from DMA 212 and to store these words in RAM 207. Since DMA 212 has been initialized by microcomputer 200, DMA 212 fetches the first word from RAM 203 and waits until DMA 213 has read this word from the proper register within DMA 212. The two DMAs continue this operation until RAM 207 has been updated completely from RAM 203.

After RAM 207 has been updated completely from RAM 203, microcomputer 200 sets timer 100-a to time for 5 milliseconds and executes a halt instruction. Microcomputer 204 sets timer 100-c to time for 7 milliseconds and executes a halt instruction. The completion signal of timer 100-a which should occur after 5 milliseconds is connected to the microcomputers by conductor 100-f and causes an interrupt to both microcomputers. If timer 100-a causes an interrupt to both microcomputers, they start in synchronization with each other, and transmit to processor 101 acknowledge orders indicating that the operation is normal. These acknowledge orders are transmitted by the microcomputers using scanner answer latches 206 and 202. In addition, microcomputer 204 resets timer 100-c resulting in no interrupt from timer 100-c. An interrupt from timer 100-c indicates an error condition exists since timer 100-a did not correctly time out. If the interrupt comes from timer 100-c, microcomputer 204 becomes the master microcomputer and starts the simplex operation of the peripheral unit controller. Microcomputer 204 also transmits an acknowledge order to processor 101 informing processor 101 that microcomputer 200 failed.

Microcomputer 200 and microcomputer 204 are now executing instructions in synchronization. In order to remain in synchronization, data which is read from peripheral unit bus 208 and I/O bus systems 104 and 107 must be read simultaneously by both microcomputers. When an I/O device is read, the I/O device places the data to be read on both I/O bus systems 104 and 107. With respect to the data on peripheral unit bus 208 which is buffered by FIFO 201 and FIFO 205, the microcomputers must read the same peripheral order from the FIFOs at the same instant of time. This is resolved by having any peripheral order written into the master microcomputer's FIFO being simultaneously written into the slave microcomputer's FIFO from the peripheral unit bus 208. In addition, the internal data operations of FIFO 201 and 205 operate in synchronization. Whether or not the microcomputers are in synchronization is determined when any I/O order is sent to the I/O devices. Any order sent to the I/O devices is matched by data matchers 211 and 219. If either data matcher indicates a mismatch, it means that microcomputer 200 and 204 are not executing instructions in synchronization. If a mismatch occurs, both microcomputers 200 and 204 enter the maintenance mode. If a permanent fault is found in the maintenance mode, the fault-free microcomputer goes into the simplex mode, and the other microcomputer remains in the maintenance mode. If no permanent fault is found, the master microcomputer goes into the simplex mode, and the slave microcomputer remains in the maintenance mode.

Figure 3:
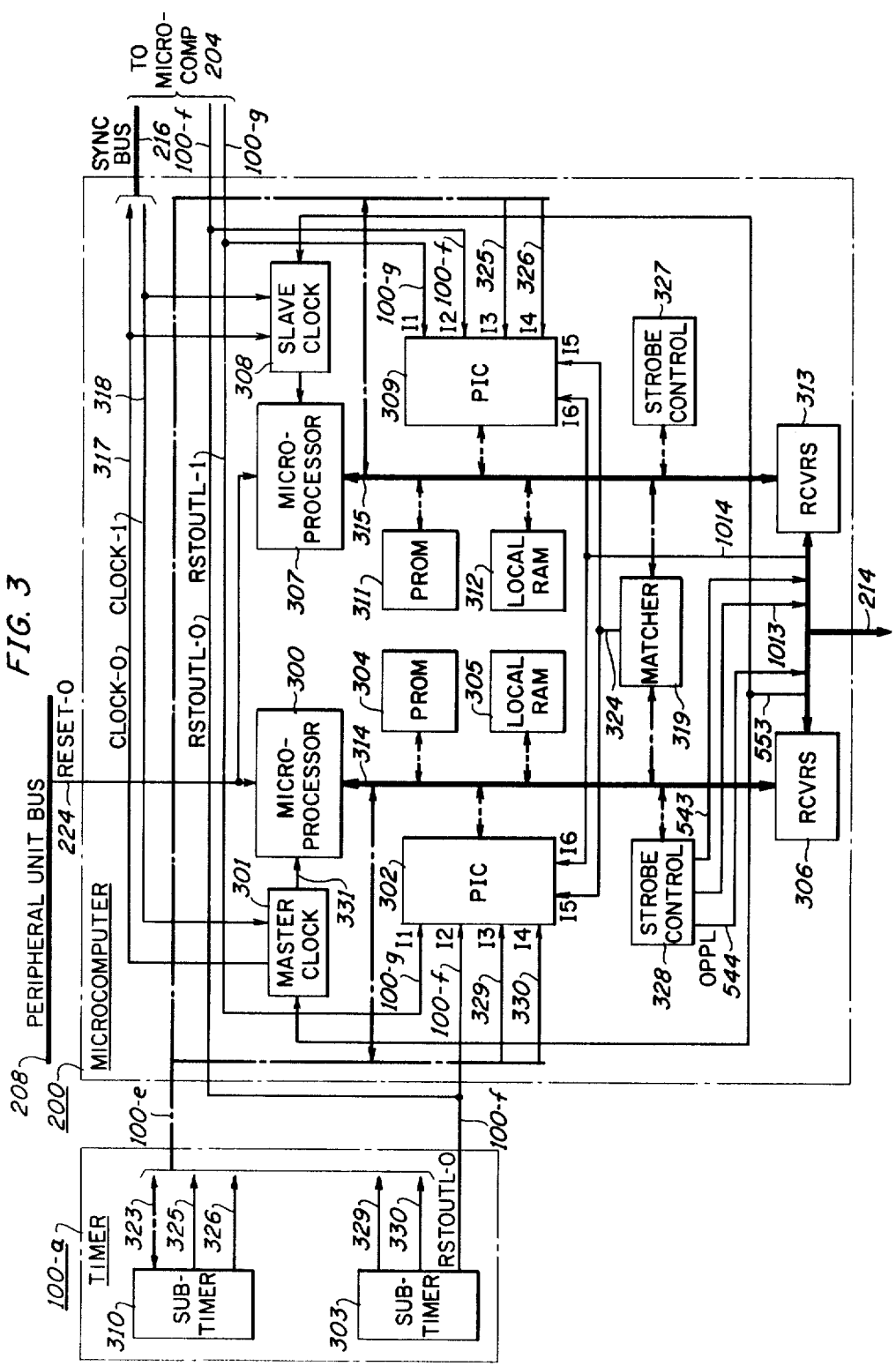
FIG. 3 shows in greater detail one of the duplicated microcomputers of the peripheral unit controller.

Microcomputer 200 is shown in greater detail in FIG. 3. Microcomputer 204 is identical in structure to microcomputer 200 and, for the sake of brevity, is not shown in detail in the drawings. Each microcomputer contains a master microprocessor (microprocessor 300) and a slave microprocessor (microprocessor 307). Microprocessor 300 is described in a later section with respect to FIG. 12. With PROM 304, master clock 301, PIC (priority interrupt circuit) 302, local RAM 305, transceivers 306, and bus 314, microprocessor 300 represents a self-contained functional microcomputer. With slave clock 308, PIC 309, PROM 311, local RAM 312, and transceivers 313, microprocessor 307 represents a self-contained functional microcomputer except that slave clock 308 contains no oscillator. The microprocessors run in synchronization and their outputs are matched by matcher 319. If microprocessors are not running in synchronization, matcher 319 transmits an error signal to both PIC 302 and PIC 309 which causes interrupts to their associated microprocessors. Upon receipt of the interrupts, microprocessor 300 and microprocessor 307 attempt to regain synchronization.

The purpose of master clock 301 is to generate the basic clock pulses required by microprocessor 300. Master clock 301 selects the output of its own internal crystal oscillator or the clock-1 signal on conductor 318. The clock-1 signal is generated by the master clock circuit in the other microcomputer of FIG. 2. This capability of master clock 301 selecting either its own internal clock oscillator or the clock-1 signal allows the generation of clock pulses to microprocessor 300 to continue should either source of clock pulses fail. Slave clock 308 is similar to master clock 301 with the following exception: it contains no internal crystal oscillator and selects either the clock-1 signal on conductor 318 or the clock-0 signal on conductor 317. The derived clock pulses are transmitted to microprocessor 307.

PROM 304 may be composed of any of a number of commercially available memory devices such as Texas Instrument TMS2532 integrated circuits. PROM 311 is identical to PROM 304. PROM 311 contains the program which is to be executed by microprocessor 300.

Local RAM 305 may be composed of any number of commercially available devices such as Intel 2114 integrated circuits. Local RAM 312 is identical to local RAM 305, whose purpose is to provide microprocessor 300 temporary storage during the execution of diagnostic programs.

PIC 302 is a priority interrupt circuit with mask capabilities for microprocessor 300. PIC 302 may be composed of any number of commercially available devices such as an Advanced Micro Devices Corporation AM9519 integrated circuit. The function of PIC 302 is to cause an interrupt to microprocessor 300 upon receipt of an input signal. Microprocessor 300 can read PIC 302 to determine which input caused the interrupt. In addition, microprocessor 300 can transmit a word to PIC 302 which disables an input from causing an interrupt. PIC 309 is identical to PIC 302.

Subtimer 303 may be any of a number of commercially available devices such as an Intel Corporation 8253 integrated circuit. The Intel 8253 is a programmable interval timer which has three independent counters. Each counter has unique completion signal output terminals. The period to be timed is determined by the word which microprocessor 300 writes into that timer via bus 314. Subtimer 303 appears as an addressable device to microprocessor 300. One of subtimer 303's outputs is signal RSTOUTL-0 on conductor 320, which is connected to input terminal I2 of PIC 302. RSTOUTL-0 is also transmitted to the other microcomputer of FIG. 2. Microprocessor 300 uses subtimer 303 to time fixed periods. After a counter in subtimer 303 has been decremented to zero, the appropriate output terminal goes to the "1" state and causes an interrupt via PIC 302 to microprocessor 300. Subtimer 310 is identical to subtimer 303 with the exception that subtimer 310 does not generate a signal similar to RSTOUTL-0. Instead, subtimer 303's RSTOUTL-0 signal is connected to PIC 309 via conductor 100-f. The reason for this distinction will become apparent from the description, given later, of how synchronization is achieved between microprocessor 300 and microprocessor 307.

Transceivers 306 may be composed of any number of commercially available devices such as Texas Instrument's 74LS245 integrated circuits which give microprocessor 300 the ability to read or write bus 214. Receivers 313 may be composed of any number of commercially available devices such as Texas Instrument's 74LS244 integrated circuits, which give microprocessor 307 the ability only to read bus 214.

When microprocessor 300 and microprocessor 307 are running in synchronization, matcher 319 compares the data signals and HACKL signal on buses 314 and 315 for error detection. If a mismatch is detected, matcher 319 interrupts microprocessor 300 via input I5 of PIC 302 and interrupts microprocessor 307 via input I5 of PIC 309. Either microprocessor can disable this interrupt by using the mask function of the appropriate PIC. Matcher 319 is a standard comparator whose output is ANDed with the appropriate control signals from the microprocessors to generate a signal on conductor 324.

The process to synchronize microcomputers 200 and 204 has been described with reference to FIG. 2. Before these microcomputers can be synchronized, each pair of microprocessors must be synchronized. This synchronization process is described with respect to microprocessors 300 and 307. During the initialization of peripheral unit controller 100, processor 101 transmits the RESET-0 signal via peripheral unit bus 208 and conductor 224 to microcomputer 200 which resets the microprocessors contained within microcomputer 200. Once microprocessor 300 has been reset, it does certain diagnostic routines to check its own integrity, sets counter 2 in subtimer 303 to cause an interrupt in 5 milliseconds, and then executes a halt instruction. Microprocessor 307 does the same operations. When subtimer 303 interrupts microprocessors 300 and 307, they start the synchronization operation. Microprocessor 300 sets counter 2 for 5 milliseconds by addressing subtimer 303 via bus 321 and writing the proper word into counter 2. When counter 2 is decremented to zero, it transmits a "1" on conductor 100-f, which is connected to input I2 of PIC 302. Conductor 100-f is also connected to PIC 309. When the "1" is present on conductor 100-f, PIC 302 and PIC 309 cause interrupts to microprocessors 300 and 307. If subtimer 303 transmits a "1", microprocessors 300 and 307 start executing instructions in synchronization; and microprocessor 300 transmits to processor 101 an acknowledge order indicating that synchronization has been achieved. This acknowledge order is transmitted via bus 314, transceivers 306, bus 214, scanner answer latches 202 (FIG. 2), and scanner answer bus 209 (FIG. 2).

The operation of DMA 212, DMA 213, and bus 217 of FIG. 2 is now discussed in greater detail. The purpose of these circuits is to transfer data between RAM 203 and RAM 207 as part of the synchronization of microcomputer 200 and microcomputer 204. If data is to be transferred from RAM 203 to RAM 207, microcomputer 200 initializes DMA 212 to access data from RAM 203 and transfers this data via bus 217 to DMA 213. Also, microcomputer 204 initializes DMA 213 to accept information from DMA 212 (via bus 217) and to write this information into RAM 207. As part of the initialization, each microcomputer supplies to the DMA (which the microcomputer controls) the starting address of the data to be transferred, the number of words to be transferred, and whether the operation is to be a read or a write. After microcomputer 200 initializes DMA 212 to read RAM 203, DMA 212 requests control of bus 214 from microcomputer 200. Once microcomputer 200 signals that DMA 212 has control of the bus, DMA 212 transmits the address and the read control signal to RAM 203. DMA 212 obtains the accessed data from RAM 203 via bus 214 and retransmits it to DMA 213 via bus 217. DMA 213 requests control of bus 215 from microcomputer 204. When microcomputer 204 signals DMA 213 (vis bus 215) that DMA 213 has control of bus 215, DMA 213 transmits to RAM 207 the address, the data received from bus 217, and the write control signal to RAM 207. After RAM 207 has been written, DMA 213 sends a completion signal to DMA 212 via bus 217. After receiving the completion signal from DMA 213, DMA 212 accesses another word from RAM 203. This process continues until DMA 212 has accessed and transmitted the number of words specified by microcomputer 200 at initialization time. If information is transferred from RAM 203 to RAM 207, DMA 212 is the master and DMA 213 is the slave as a matter of convention.

Figure 4:
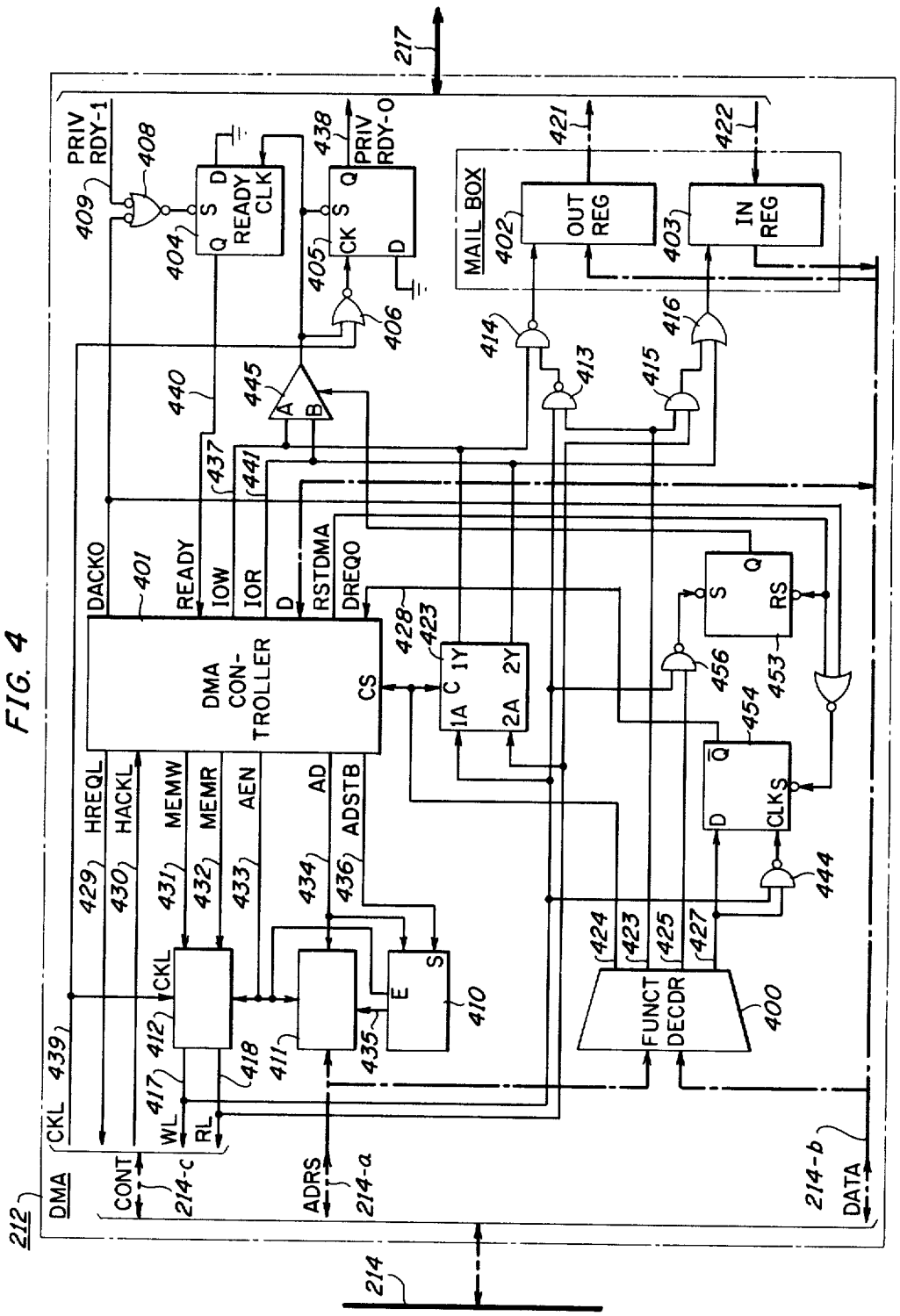
FIG. 4 shows a Direct Memory Access circuit (DMA) which is a component of the peripheral unit controller.

DMA circuit 212 is shown in greater detail in FIG. 4. DMA circuit 213 is identical in structure to DMA 212 and, for the sake of brevity, is not shown in detail in the drawing. Microcomputer 200 of FIG. 2 performs three distinct operations with respect to the DMA 212. The first operation is the reading and writing of the mailbox which is output register 402 and input register 403. These two registers are used by microcomputers 200 and 204 for communication between the two microcomputers. Output register 402 transmits its contents to DMA 213 over conductors 421, and input register 403 receives data from DMA 213 via conductors 422. DMA 213 has an input register to receive data from conductors 421 and an output register to transmit data via conductors 422. Output register 402 is written by microcomputer 200 executing a write memory instruction which generates the following sequences of signals. An address of FD23$_{16}$ on conductors 214-a and a "1" on conductor 417 which is the WL signal are transmitted. This transmission causes the data on conductors 214-b to be clocked by the output of NAND gate 414 into output register 402. The address is decoded by function decoder 400 which transmits a "1" on conductor 423. Upon receipt of a "1" on both conductors 423 and 417, NAND gate 413 transmits a "0" to NAND gate 414 causing NAND gate 414 to clock output register 402. The same address is used to read input register 403, but microcomputer 200 executes a read memory instruction. The execution of a read memory instruction pulses the RL signal on conductor 418 to a "1", which causes input register 403 to transmit its information on conductors 214-b. The address is decoded by function decoder 400 which transmits a "1" on conductor 423. Upon receipt of a "1" on both conductors 423 and 418, AND gate 415 transmits a "1" to OR gate 416 whose output enables input register 403. Microcomputer 200 then reads the signals on conductors 214-b.

The second operation to be performed is the initialization of DMA controller 401. DMA controller 401 may be any number of commercially available devices such as an Advanced Micro Devices Corporation's AM9517 integrated circuit. Microcomputer 200 initializes DMA controller 401 with the starting address, the number of words to be transferred, and the command data. DMA controller 401 stores all this information internally. As is common for DMA controllers of this type, DMA controller 401 uses the command data to determine the types of operations it is to perform and to determine its own internal states. The starting address indicates the first location to be accessed. DMA controller 401 decrements this starting address until all the words have been accessed as defined by the number of words to be transferred. Microcomputer 200 transmits the information to DMA controller 401 by executing memory write instructions. When CS input of DMA controller 401 is a "1", DMA controller 401 internally stores the information on conductors 214-b. When microcomputer 200 executes a memory write instruction to DMA 212, the eight most significant bits of the address are decoded by function decoder 400, which in turn enables DMA controller 401 via CS input over conductor 424. DMA controller 401 decodes the eight least significant bits of the address read from its AD inputs to determine the type of information on conductors 214-b. The address bits are transmitted via conductors 434, transceivers 411, and conductors 214-a.

The third operation of DMA 212 is the transfer of data to and from RAM 203. Assume for discussion that DMA 212 is to transfer data to DMA 213. Microcomputer 200 designates that DMA 212 is to transfer data to DMA 213 by setting flip-flop 453 and starts the transfer by setting D flip-flop 454. When microcomputer 200 executes a write memory instruction with an address of FD04$_{16}$ and the data of 08$_{16}$, flip-flop 453 is set by the following sequence. When function decoder 400 detects an address of FD04$_{16}$ and data of 08$_{16}$, it transmits a "1" on conductor 425. During the execution of a write memory instruction, microcomputer 200 transmits a "1" on conductor 417 (the WL signal). A "1" on both conductor 417 and conductor 425 sets flip-flop 453 via NAND gate 456. When microcomputer 200 executes a memory write instruction at address FD0$_{16}$, DMA request D flip-flop 454 is set by the following sequence. An address of FD00 causes function decoder 400 to transmit a "1" on conductor 427, which in turn conditions the D input of D flip-flop 454. At the end of the write instruction, D flip-flop 454 is set by the output of NAND gate 444 going to a "1". NAND gate 444's output is a "0" during the memory write instruction because both conductors 443 and 427 are transmitting "1s". The output of flip-flop 454 is transmitted to DMA controller 401's DREQ0 input terminal by conductor 428.

The output of flip-flop 454 being a "1" causes DMA controller 401 to initiate the transfer of a block of data from RAM 203. DMA controller 401 first transmits the HREQL signal (a "1") on conductor 429. Microcomputer 200 responds by transmitting the HACKL signal as a "1" on conductor 430 and disconnects itself from bus 214. DMA controller 401 transmits on bus 434 the eight most significant address bits and strobes these bits into latch 410 by transmitting a "1" on conductor 436 (which is connected to ADSTB output terminal). DMA controller 401 (1.) transmits the eight least significant bits of the address on bus 434, (2.) makes the AEN output terminal a "1", which enables the output of transceivers 411 and latch 410 onto address conductors 214-a, and (3.) makes MEMR output terminal connected to conductor 432 a "1", which is retransmitted on conductor 418 (RL signal) via buffers 412. The previous signals cause RAM 203 to read the memory location addressed by the address on conductors 214-a and place the accessed data on conductors 214-b. DMA controller 401 writes this data into output register 402 by making IOW output terminal a "1". This signal is transmitted to output register 402 by conductor 437 via NAND gate 414. Output register 402 then transfers this information to conductors 421. Since flip-flop 453 had previously been set, the signal on 437 also causes flip-flop 405 to be set via data selector 445. Flip-flop 453 being set causes data selector 445 to select its A input. Flip-flop 405 being set transmits a "1" to DMA 213 via conductor 438. When conductor 437 is transmitting a "0" and conductor 439 (CKL signal) is transmitting a "0", flip-flop 405 is reset by NOR gate 406. Flip-flop 404 is set when DMA 213 responds with a "0" on conductor 409 (PRIV RDY-1 signal). When conductor 437 is transmitting a "0", flip-flop 404 is reset. When flip-flop 404 is set, it causes a "1" to be transmitted to ready input terminal of DMA controller 401 via conductor 440. Ready input terminal being a "1" causes DMA controller 401 to access another word from RAM 203.

If DMA controller 401 is the slave DMA, data is written from input register 403 over conductors 214-b into RAM 203. The operation is similar to that described in the previous paragraph with the exception that MEMW output terminal (which is connected to 431) and IOR output terminal (which is connected to conductor 441) are used. In addition, flip-flop 453 is not set. Hence, data selector 442 selects conductor 441 (IOR output terminal).

Figure 5:
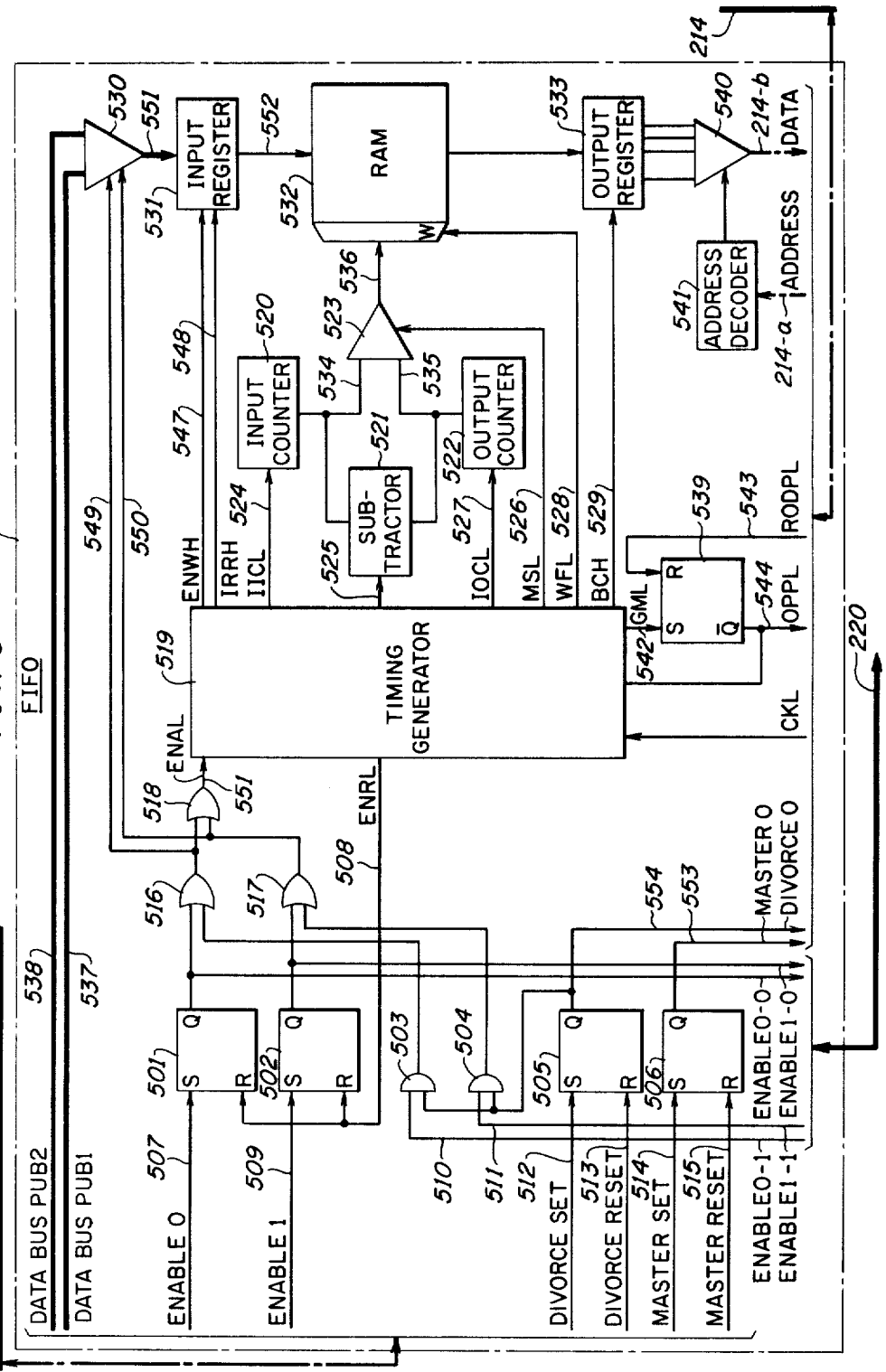
FIG. 5 shows in greater detail one of the first-in/first-out memory (FIFO) circuits of FIG. 2.

FIFO 201 of FIG. 2 is shown in greater detail in FIG. 5. FIFO 205 is identical in structure to FIFO 201 and, for the sake of brevity, is not shown in detail in the drawings. Under control of timing generator 419, data is moved from either PUB2 or PUB1 through data selector 530 into input register 531 via conductors 551. From input register 531 the data is transferred to RAM 532 via conductors 552. After microcomputer 200 has emptied output register 533, timing generator 519 transfers information from RAM 532 into output register 533 and sets flip-flop 539. Flip-flop 539 being set indicates that more data is available in output register 533. Microcomputer 200 indicates that it has taken the information from output register 533 by resetting flip-flop 539. Peripheral unit bus 208 is further composed of data bus PUB2 538 and data bus PUB1 537. Both data busses 538 and 537 transmit 24 bits of data. Processor 101 designates whether it is using data bus PUB1 537 or data bus PUB2 538 by transmitting a "1" on conductor 507 (ENABLE0) or conductor 509 (ENABLE1). For the sake of description, assume that processor 101 is transmitting information on data bus PUB1 537. Processor 101 transmits the data on conductors 537. Processor 101 also transmits a "1" on conductor 507 which causes flip-flop 501 to be set. Data selector 530 selects data bus PUB1 537, since the output of flip-flop 501 via OR gate 516 and conductor 549 causes data selector 530 to select conductors 537. The output of flip-flop 501 via gates 516 and 518 causes the ENAL signal on conductor 551 to be a "0" which further causes timing generator 519 to start the input sequence as defined by FIG. 6. The ENAL signal is shown as line 602 on FIG. 6. Timing generator 519 transmits the ENWH signal, a "1", on conductor 547, which enables input register 531. Input register 531 is composed of SR flip-flops which had been previously set to zero. The data bits of data bus PUB1 537 are transmitted through data selector 530 onto conductors 551, and set into input register 531. Timing generator 519 selects the output of inputer counter 520 via conductors 534 and data selector 523 to address conductors 536 of RAM 532. This selection is done by making the MSL signal on conductor 526 a "0" as shown in line 608 of FIG. 6. Input counter 520 contains the address of the location in RAM 532 where the new input data is to be written. Timing generator 519 writes RAM 532 by making signal WFL on conductor 528 a "0" as shown in line 604. Timing generator 519 then increments input counter 520 by pulsing signal IICL on conductor 524 to a "1" as shown in line 605. Timing generator 519 (1.) resets input register 531 by pulsing the IRRH signal on conductor 548 to a "1" as shown in line 606, and (2.) resets flip-flop 501 by pulsing the ENRL signal on conductor 508 to a "0" as shown in line 607.

Timing generator 519 moves information from RAM 532 as designated by output counter 522 to output register 533 and sets flip-flop 539 to inform microcomputer 200 that there is a word in output register 533. The sequence of timing signals used for this operation are shown in FIG. 7. When (1.) OPPL signal on conductor 544 as shown in line 704 is a "1", (2.) the ENAL signal on conductor 551 as shown in line 706 is a "1", and (3.) subtractor 521 is transmitting a "1" on conductor 525, then timing generator 519 pulses signal BCH on conductor 529 as shown in line 701 to "1". Signal BCH being pulsed to a "1" causes the output of RAM 532 to be clocked into output register 533 on the rising edge of the BCH signal. The ENAL signal being a "1" indicates that processor 101 is not attempting to write information into input register 531. A "1" on conductor 525 indicates that there is a word to be moved from RAM 532 to output register 533. Timing generator 519 increments output counter 522 by pulsing the IOCL signal on conductor 527, as shown in line 703, to a "1". The MSL signal on conductor 526 (as shown on line 705) is a "1" which causes data selector 523 to select the output from output counter 522 on conductors 535 to be placed over conductors 536 as the address to RAM 532. Flip-flop 539 is set by timing generator 519 generating a pulse on conductor 542 as shown in line 702. The setting of flip-flop 539 causes the output of flip-flop 539, the OPPL signal on conductor 544, to be made a "0" as shown in line 704.

Microcomputer 200 reads output register 533, a 24-bit word, as three successive bytes of data. The microcomputer performs three read memory operations using addresses $FC00_{16}$, $FC01_{16}$ and $FC02_{16}$. Address decoder 541 selects the correct byte out of output register 533 by properly gating data selector 540 which places the information on conductors 214-b. Microcomputer 200 sets the output of flip-flop 539 to a "1" by pulsing signal RODPL to a "1" on conductor 543.

Flip-flop 505 is the divorce flip-flop, which when set treats ENABLE0-1 and ENABLE1-1 (coming from FIFO 205 via bus 220) in the same manner as the outputs of flip-flops 501 and 502. The circuit of FIG. 5 which represents FIFO 201 generates ENABLE0-0 and EANBLE1-0 which are transmitted to FIFO 205 via bus 220 and are treated in the same manner. When flip-flop 505 is set, peripheral orders transmitted to FIFO 205 are accepted by FIFO 201 and sotred in RAM 532 in synchronization with FIFO 205. The synchronization of microcomputers 200 and 204 is an important feature, since they must receive their peripheral orders at the same instant from their respective FIFOs. When flip-flop 505 is reset by the divorce reset signal on conductor 513, FIFO 201 is independent of FIFO 205. FIFO 205 has a flip-flop the same as flip-flop 505 which determines whether or not it is operating independently of FIFO 201.

Flip-flop 506, the master/slave flip-flop, is set by the master set signal on conductor 514 and reset by the master reset signal on conductor 515. The output of flip-flop 506 is the MASTER0 signal on conductor 553. The use of the MASTER0 signal is later described in more detail with respect to the clock circuits, I/O interface 210, and matcher 211. One purpose of the MASTER0 signal with respect to I/O devices is to determine which microcomputer has control of the I/O devices.

For reliability, each of the two microprocessors in both microcomputer 200 and microcomputer 204 has its own clock circuit. There is a total of four clock circuits. When microcomputers 200 and 204 are operating in synchronization, the clock circuits must be driven by the same oscillator; but for reliability, the clock circuits must automatically switch to the other oscillator if the designated oscillator fails. Each master clock (master clock 301 of FIG. 3) associated with microcomputer 200 or 204 has an oscillator. The master flip-flops in FIFO 201 and 205 designate the oscillator to be used.

Figure 8:
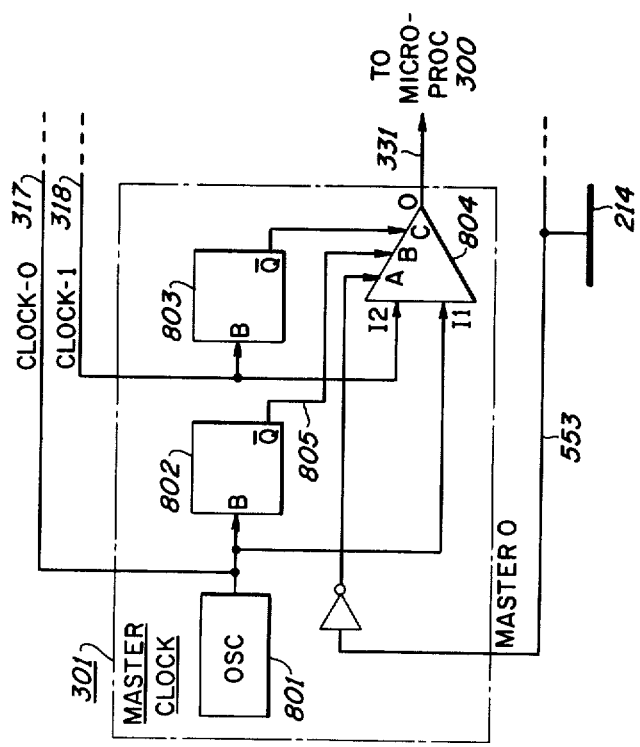
FIG. 8 shows in greater detail the master clock circuit of FIG. 3.

The automatic switching, in case the designated oscillator fails, is now described. Master clock 301 of FIG. 3 is shown in greater detail in FIG. 8. Data selector 804 selects the clock-0 or clock-1 signal as defined by Table 1. Retriggerable monostable flip-flops 802 and 803, (which could advantageously be 74LS123 retriggerable monostable integrated circuits), detect whether the clock signal is still active. The timing period of retriggerable monostable flip-flop 802 is 200 percent greater than the period of the clock-0 signal on conductor 318. If oscillator 801 ceases to produce a clock-0 signal at the proper frequency, retriggerable monostable flip-flop 802 times out and makes its Q output a "1", which is transmitted to data selector 804 by conductor 805. Data selector 804 responds as defined by Table 1. Retriggerable monostable flip-flop 803 functions in a similar manner, but note that the Q output is used not the $\overline{Q}$.

TABLE 1

| C | B | A | O |
|---|---|---|---|
| 0 | 0 | 0 | I1 |
| 0 | 0 | 1 | I1 |
| 0 | 1 | 0 | I1 |
| 0 | 1 | 1 | I1 |
| 1 | 0 | 0 | I1 |
| 1 | 0 | 1 | I2 |
| 1 | 1 | 0 | I2 |
| 1 | 1 | 1 | I2 |

Figure 9:
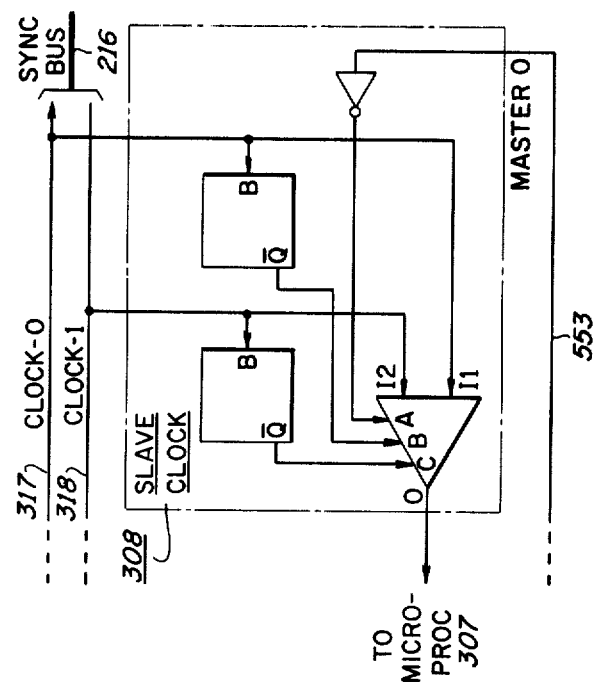
FIG. 9 shows in greater detail the slave clock circuit of FIG. 3.

Slave clock 308 is shown in greater detail in FIG. 9. The circuit of FIG. 9 operates identically to the circuit of FIG. 8 with the exception that there is no oscillator 801.

Figure 10:
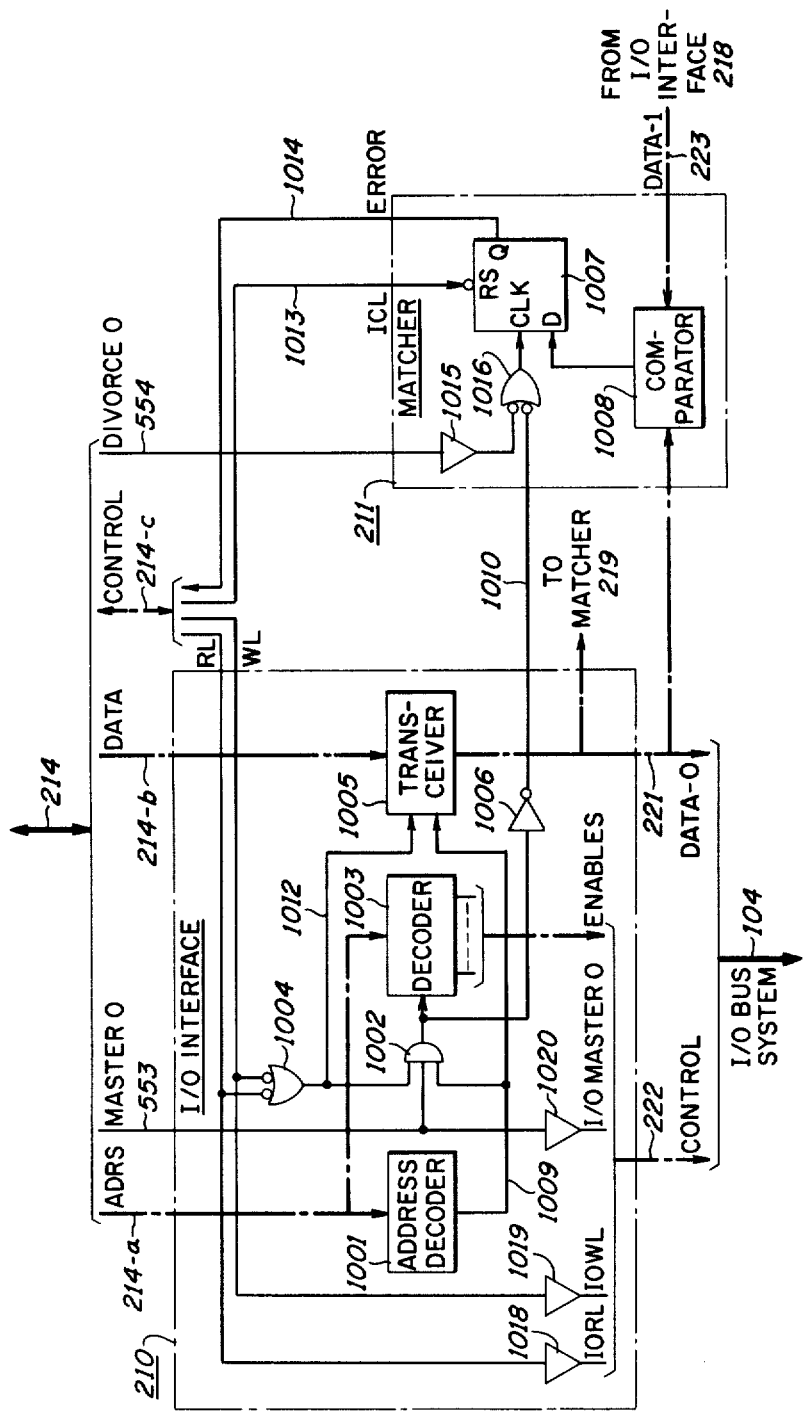
FIG. 10 shows in greater detail the I/O interface of FIG. 2.

I/O interface 210 and I/O matcher 211 of FIG. 2 are shown in greater detail in FIG. 10. I/O interface 218 and matcher 219 are similar. I/O interface 210 is composed of elements 1001 through 1006, and I/O matcher 211 is composed of elements 1007, 1008, 1015, and 1016. Microcomputer 200 reads and writes from the I/O devices by executing read and write memory instructions. Address decoder 1001 and decoder 1003 decode these read and write memory instructions and strobe the proper enable leads on control bus 222. The I/O data on I/O data-0 bus 221 is compared against the information on I/O data-1 bus 223 for each read or write instruction.

Microcomputer 200 performs a write instruction by transmitting the address on conductors 214-a, by transmitting the data on conductors 214-b, and by pulsing the WL lead to "0". The address is decoded by address decoder 1001 which makes the signal on conductor 1009 a "1". If the MASTER0 signal is a "1" on conductor 553, AND gate 1002 reflects the WL signal vai NAND gate 1004 on its output. The output of AND gate 1002 strobes decoder 1003. Decoder 1003 decodes the six least significant address bits on conductors 214-a. A "1" on conductors 1009 and 1012 conditions transceivers 1005 so that the data is placed on the I/O data-0 bus 221. If conductor 554 is in the "1" state, the output of inverter 1015 conditions gate 1016; and then, the output of AND gate 1002 clocks flip-flop 1007. Flip-flop 1007 samples the output of comparator 1008, which indicates an error if I/O data-0 bus 221 and I/O data-1 bus 223 do not contain the same data. Flip-flop 1007 is reset by the ICL signal on conductor 1013 being pulsed to "0" by microcomputer 200. The output of flip-flop 1007 (the error signal on conductor 1014) is routed to the interrupt structure of microcomputer 200.

Figure 11:
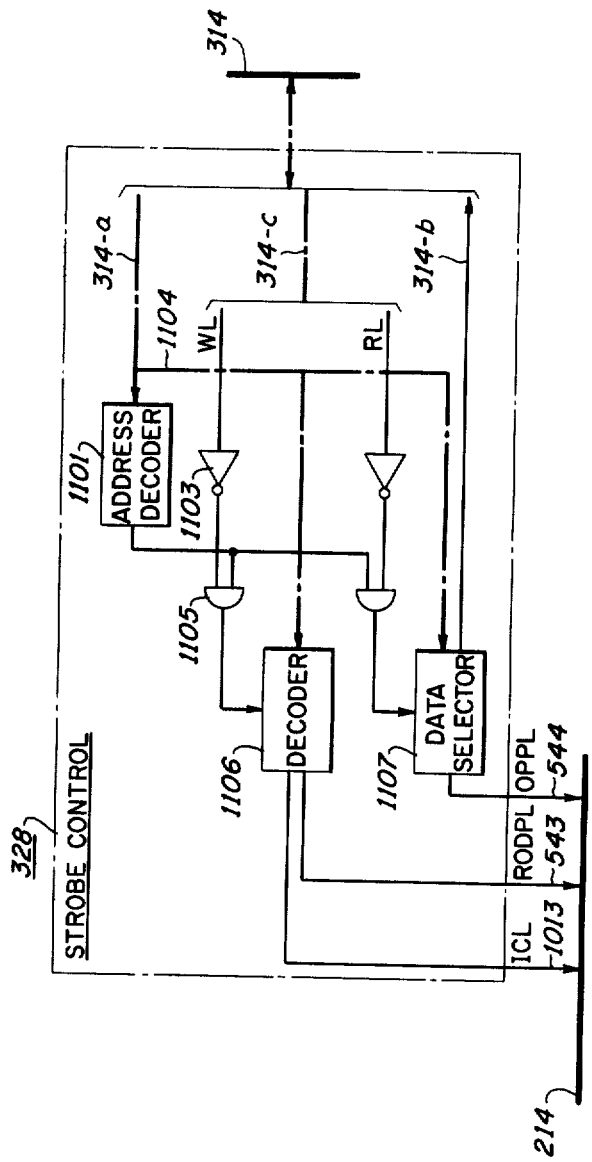
FIG. 11 shows in more detail the strobe control circuit of FIG. 3.

Strobe control 328 of FIG. 3 is shown in greater detail in FIG. 11. Strobe control 328 functions by each output of decoder 1106 having a unique address on bus 314-a. When address decoder 1101 detects one of these addresses and the WL signal on bus 314-c, then decoder 1106 pulses the appropriate output to a "0". Decoder 1106 also decodes bus 314-a to determine which output to pulse. When both the output of address decoder 1101 and the output of inverter 1103 are a "1", the output of AND gate 1105 is a "1", which properly conditions decoder 1106. Data selector 1107 functions similarly to decoder 1106 except that it reads data via bus 314-b. When the proper address is present on bus 314-a and a "1" is being transmitted on the RL signal of bus 314-c, data selector 1107 places the state of conductor 544 onto bus 314-b.

Figure 12:
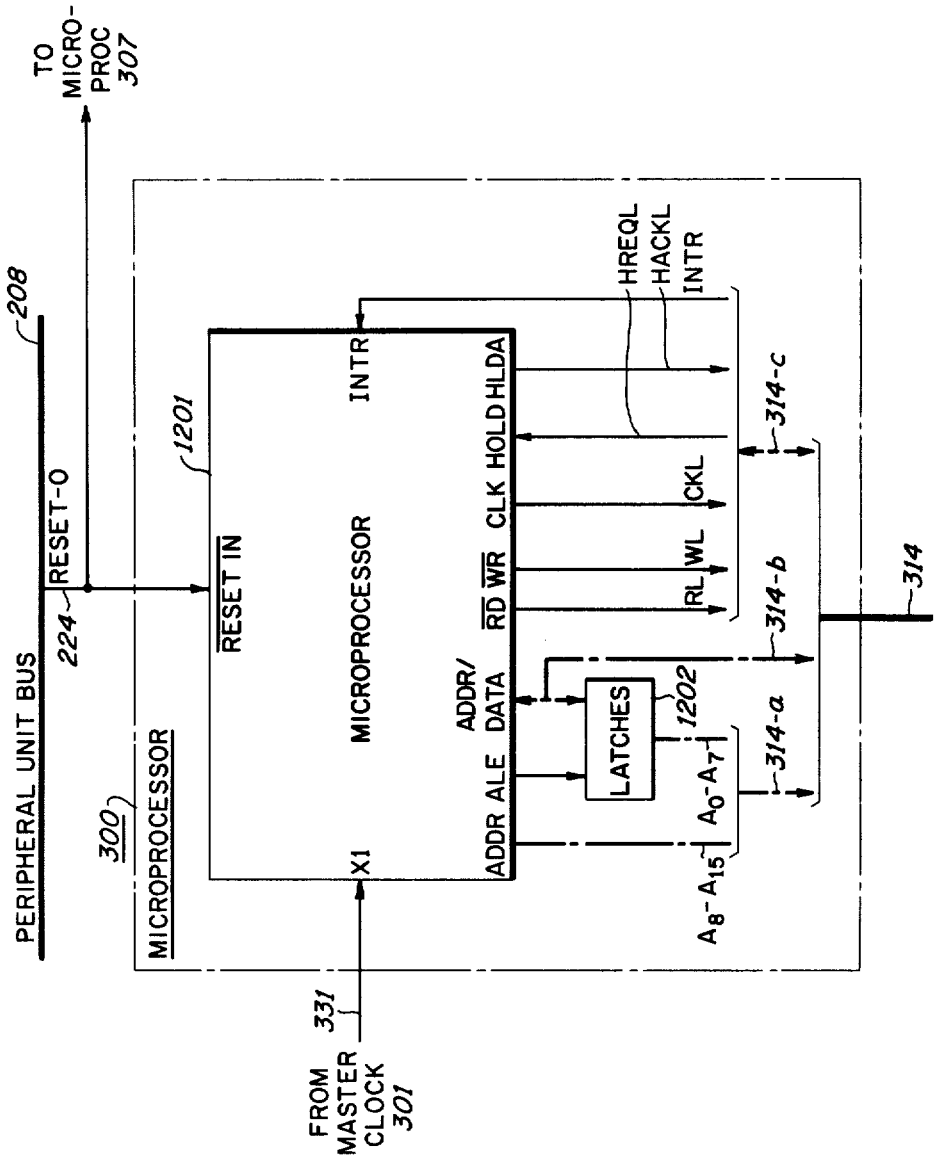
FIG. 12 is a block diagram representation of one of the microprocessors of FIG. 3.

Microprocessor 300 of FIG. 3 is shown in greater detail in FIG. 12. Microprocessor 307 is identical in structure to microprocessor 300 and, for the sake of brevity, is not shown in detail in the drawings. Microprocessor 1201 may be any number of commercially available devices such as an MCS-8085 microprocessor manufactured by Intel Corporation. A complete description of the MCS-8085 is given in the Intel Data Catalog 1977, page 10–52. Latch 1202 may be any number of commercially available devices such as the Intel 8212 integrated circuit. Microprocessor 1201 receives its basic clock stimulus via input X1 (which is received over line 331) from the master clock of FIG. 8. Microprocessor 1201 places address information on bus 314-a and data information on bus 314-b. In addition, bus 314-c transmits and receives the necessary control information.

It is to be understood that the above-described arrangement is merely an illustrative application of the principles of the invention; numerous other arrangements may be devised by those skilled in the art without departing from the spirit and scope of the invention.

What is claimed is:

1. In a data processing system including a peripheral unit controller comprising duplicated first and second subprocessors for improved reliability and a first timer circuit external to said subprocessors for controlling the synchronous starting of said subprocessors, said system comprising:
a processor adapted to generate and transmit a plurality of peripheral orders to said first and second subprocessors; and transmission means interconnecting said processor and said subprocessors;
said first timer circuit being responsive to a first timer start signal to generate a first timer completion signal a predetermined period of time after the occurence of said first timer start signal;
said first subprocessor having a halt state and being responsive to a first one of said peripheral orders received from said transmission means to generate said first timer start signal and to enter its halt state;
said second subprocessor having a halt state and being responsive to a second one of said peripheral orders received on said transmission means to enter its halt state and said first and said second subprocessors being responsive to said timer completion signal while in their halt state to start synchronized operation.

2. A peripheral unit controller in accordance with claim 1, characterized in that said first subprocessor is further responsive to said first timer completion signal after starting synchronized operation with said second subprocessor to transmit a first acknowledge message to said processor; and
said second subprocessor is further responsive to said first timer completion signal after starting synchronized operation with said first subprocessor to transmit a second acknowledge message to said processor, whereby transmission of said first and said second acknowledge messages is indicative of said subprocessors initiating synchronized operation in response to said first timer completion signal.

3. A data processing system in accordance with claim 2 characterized in that said peripheral unit controller further comprises a second timer circuit (100-c) connected to said second subprocessor (100-d);
said second timer circuit being responsive to a second timer start signal to generate a second timer completion signal a second predetermined period of time, greater than said first predetermined period of time, after occurrence of said second timer start signal; and
said second subprocessor further responsive to said second one of said peripheral orders to generate said second timer start signal, and resonsive to said second timer completion signal in the absence of said first timer completion signal while in its halt state to transmit a third acknowledge message to said processor via said transmission means, indicative of nonsynchronization of operation of said subprocessors.

4. A data processing system in accordance with claim 2 or claim 2 characterized in that said peripheral unit controller further comprises bus means (100-m) interconnecting said first and said second subprocessors;
said first subprocessor is further responsive to said first one of said peripheral orders to transmit a subprocessor order to said second subprocessor via said bus means; and
said second subprocessor is responsive to said subprocessor order and said second one of said peripheral orders to enter its halt state.

5. A data processing system in accordance with claim 2 wherein said processor (101) is further adapted to generate and transmit an initialization peripheral order to said peripheral unit controller via said transmission means before transmitting said first one and said second one of said peripheral orders characterized in that said first subprocessor comprises first microprocessor arrangement (300, 301, 302, 304) having a halt state and being responsive to said initialization peripheral order to apply a timer initialization signal to said first timer circuit and enter its halt state, second microprocessor arrangement (307, 308, 309, 311) having a halt state and being responsive to said initialization order to enter its halt state, and means (319) for detecting synchronous operation of said first and said second microprocessor arrangements and for generating a synchronization signal;
said first timer circuit being responsive to said timer initialization signal to generate an initial timer completion signal a predetermined period of time after receipt of said timer initialization signal;
said first and said second microprocessor arrangements each being responsive to said initial timer completion signal while in the halt state to initiate synchronous operation; and
said first microprocessor arrangement being further responsive to said initial timer completion signal to transmit to said processor via said transmission means an acknowledge message indicative of synchronous operation of said microprocessor arrangements.

6. A data processing system in accordance with claim 2 characterized in that said first subprocessor comprises a first microprocessor arrangement (300, 301, 302, 304) adapted to generate subtimer control signals and a second microprocessor arrangement adapted to generate subtimer control signals (307, 308, 309, 311) and said first timer circuit of said first subprocessor comprises a first subtimer (303) having a first output terminal connected to said first and said second microprocessor arrangements and responsive to said first timer start signal to generate said first timer completion signal on said first output terminal and having a second output terminal connected to said first microprocessor arrangement, said first subtimer being responsive to subtimer control signals from said first microprocessor arrangement to generate timer completion signals on said second output terminal; and
said first timer circuit further comprising a second subtimer (310) having an output terminal connected to said second microprocessor arrangement and responsive to subtimer control signals from said second microprocessor arrangement to generate timer completion signals on said output terminal of said second subtimer.

7. A data processing system in accordance with claim 1 characterized in that said first and said second subprocessor each comprise a microcomputer (200, 204), and associated memory arrangement (201, 205), and memory bus means (214, 215) interconnecting each microcomputer and its associated memory arrangement, each of said microcomputers being adapted to generate memory read signals and to execute functions defined by data words stored in the said associated memory arrangement and said memory arrangements each being responsive to said memory read signals from the associated microcomputer to transmit data words representing said functions to the associated microcomputer;

said peripheral unit controller further comprisng interconnecting means (220) interconnecting said memory arrangement of said first subprocessor and said memory arrangement of said second subprocessor;

said memory arrangement of said first subprocessor being responsive to a certain one of said peripheral orders to store one of said data words defined by said certain peripheral order and to generate an address select signal and to transmit said address select signal to said memory arrangement of said second subprocessor on said interconnecting means; and said memory arrangement of said second subprocessor being responsive to said select signal to store said data word defined by said certain peripheral order.

8. A data processing system in accordance with claim 7 characterized in that said memory arrangements each comprise a storage means (532) and apparatus (519, 520, 521, 522, 523) for accessing said storage means in accordance with a first-in/first-out method and decode means (501, 502, 516, 517, 518); and said memory arrangement of said second subprocessor further comprises a control flip-flop (505) having first and second stable states and said memory arrangement being responsive to said address select signal to store said data word in said storage means when said flip-flop is in its first stable state.

9. A data processing system in accordance with claim 1 characterized in that said first subprocessor comprising a bistable means (506) having a first and a second stable state and a first clock oscillator means (801) for generating a first oscillator output signal;

said second subprocessor comprising a second oscillator means (801) for generating a second oscillator output signal; and said first subprocessor further comprising a means (802, 803, 804) connected to said first and said second oscillator means and said means responsive to said first oscillator output signal to generate a first clock signal in accordance with said first oscillator output signal when said bistable means is in said first stable state or only said first oscillator output signal is present, and responsive to second oscillator output signal to generate said first clock signal in accordance with said second oscillator output signal when said bistable means is in said second stable state or only said second oscillator output signal is present.

10. A data processing system in accordance with claim 9 characterized in that said first subprocessor comprises a second means (901, 902, 903) connected to said first and said second clock oscillator means (801) and responsive to said first oscillator output signal to generate a second clock signal in accordance with said first oscillator output signal when said bistable means is in said first stable state or only said first oscillator output signal is present, and responsive to said second oscillator output signal to generate said second clock signal in accordance with said second oscillator output signal when said bistable means is in said second stable state or only said second oscillator output signal is present.

11. A data processing system in accordance with claim 1 and further comprising an input/output device (105, 106) and input/output bus means (104, 107) interconnecting said peripheral unit controller and said input/output device, characterized in that said first and said second subprocessor each comprise interface means (200, 210; 204, 218) for generating an input/output order and to transmit said input/output order to said input/output device; and a control circuit (506) for generating an input/output control signal;

said input/output device being responsive to said input/output control signal of said first subprocessor and said input/output order of said first subprocessor to perform functions defined by said input/output order of said first subprocessor; and said input/output device being responsive to said input/output control signal of said second subprocessor and said input/output order of said second subprocessor to perform functions specified by said input/output order of said second subprocessor.

12. A data processing system in accordance with claim 11 characterized in that said peripheral unit controller further comprises matcher means (211, 219) connected to said interface means of said first and said second subprocessors for comparing input/output orders generated by both of said interface means and for generating an error signal in the event of a mismatch between input/output orders generated by said interface means.

13. A data processing system in accordance with claim 1 characterized in that said first and said second subprocessor each comprise a microcomputer (200, 204) adapted to generate memory data transfer signals, a memory arrangement (203, 207) for storing data words, and a memory data transfer circuit (212, 213) for generating memory address signals and for controlling the reading and writing of data words in said memory;

said peripheral unit controller further comprising interconnecting means (217) interconnecting said memory data transfer circuits of said first and said second subprocessors;

said memory data transfer circuit of said first subprocessor being responsive to said memory data transfer signals of said microcomputer of said first subprocessor to read one of said data words from said memory arrangement of said first subprocessor and to transmit said data word to said memory data transfer circuit of said second subprocessor; and said memory data transfer circuit of said second subprocessor being responsive to said memory data transfer signals from said microcomputer of said second subprocessor to write said one of said data words in said memory arrangement of said second subprocessor.

* * * * *